US012715419B2

(12) United States Patent
Shahriari et al.

(10) Patent No.: US 12,715,419 B2
(45) Date of Patent: Aug. 25, 2026

(54) TRAJECTORY CONTROL SYSTEM FOR AUTOMATED DRIVING INCLUDING FEEDFORWARD AND MODEL PREDICTIVE CONTROL

(71) Applicant: GM GLOBAL TECHNOLOGY OPERATIONS LLC, Detroit, MI (US)

(72) Inventors: Mohammadali Shahriari, Markham (CA); Ashraf Abualfellat, Grand Blanc, MI (US); Reza Zarringhalam, Whitby (CA); Amirreza Mirbeygi Moghaddam, Toronto (CA); Mohammed Raju Hossain, Markham (CA); Brian Porto, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 6 days.

(21) Appl. No.: 18/984,412

(22) Filed: Dec. 17, 2024

(65) Prior Publication Data

US 2026/0167172 A1 Jun. 18, 2026

(51) Int. Cl.
*B60W 10/20* (2006.01)
*B60W 20/11* (2016.01)
(Continued)

(52) U.S. Cl.
CPC ............ *B60W 10/20* (2013.01); *B60W 20/11* (2016.01); *B60W 50/00* (2013.01); *G06V 20/588* (2022.01);
(Continued)

(58) Field of Classification Search
CPC ....... B60W 10/20; B60W 20/11; B60W 50/00
See application file for complete search history.

(56) References Cited

U.S. PATENT DOCUMENTS

| | | | | |
|---|---|---|---|---|
| 11,768,500 B2 * | 9/2023 | Inoue | .................... | B60W 30/10 701/25 |
| 2015/0224987 A1 * | 8/2015 | Tachibana | ............. | B60W 30/09 701/1 |

(Continued)

OTHER PUBLICATIONS

Wang, Z.; Sun, K.; Ma, S.; Sun, L.; Gao, W.; Dong, Z., “Improved Linear Quadratic Regulator Lateral Path Tracking Approach Based On A Real-Time Updated Algorithm With Fuzzy Control And Cosine Similarity For Autonomous Vehicles”, Electronics 2022, 11, 3703. <https://doi.org/10.3390/electronics11223703.>.

(Continued)

*Primary Examiner* — Long T Tran

(57) ABSTRACT

A vehicle includes an electronic power steering (EPS) system configured to steer front wheels of the vehicle in response to a steering command. A trajectory control module is configured to generate the steering command. The trajectory control module includes a perception module configured to identify a target path for the vehicle and a planning module configured to determine a blend path for the vehicle to the target path. A control module includes a feedforward module configured to generate a feedforward steering command, a model predictive control module configured to generate a feedback steering command in response to the feedforward steering command and model predictive control, and a summer configured to generate the steering command in response to a sum of the feedforward steering command and the feedback steering command.

20 Claims, 5 Drawing Sheets

(51) Int. Cl.
*B60W 50/00* (2006.01)
*G06V 20/56* (2022.01)

(52) U.S. Cl.
CPC ............... *B60W 2050/0009* (2013.01); *B60W 2050/0012* (2013.01); *B60W 2420/403* (2013.01); *B60W 2552/53* (2020.02)

(56) References Cited

U.S. PATENT DOCUMENTS

| | | | | |
|---|---|---|---|---|
| 2018/0345960 | A1* | 12/2018 | Fujii | B60W 30/0953 |
| 2018/0345963 | A1* | 12/2018 | Maura | B60W 60/0011 |
| 2019/0155294 | A1* | 5/2019 | Inoue | B60W 30/10 |
| 2019/0241188 | A1* | 8/2019 | Tsuchiya | B60W 30/12 |
| 2020/0086890 | A1* | 3/2020 | Ikeda | G09G 5/37 |
| 2020/0159225 | A1* | 5/2020 | Zeng | G05D 1/0088 |
| 2021/0253166 | A1* | 8/2021 | Tomoi | B62D 15/025 |
| 2024/0409120 | A1* | 12/2024 | Shibaike | B60W 40/10 |

OTHER PUBLICATIONS

Stano, Pietro & Montanaro, Umberto & Tavernini, Davide & Tufo, M. & Fiengo, G. & Novella, L. & Sorniottie, A., (2022), “Model Predictive Path Tracking Control For Automated Road Vehicles: A Review”, Annual Reviews in Control. 55. 10.1016/j_arcontrol.2022. 11.001.

Rajamani, R. (2006), “Vehicle Dynamics and Control”. 10.1007/0-387-28823-6.

Woo, S.; Heo, C.; Jeong, M.-O; Lee, J.-M, “Integral Analysis Of A Vehicle And Electric Power Steering Logic For Improving Steering Feel Performance”, Appl. Sci. 2023, 13, 11598. <https://doi.org/10.3390/app132011598.>.

German Office Action from counterpart DE1020251046603, dated Sep. 22, 2025.

“Trajectory Tracking of Autonomous Vehicle Using Clothoid Curve,” by Jianshi Li et al.; Applied Sciences 2023, 13, 2733; MDPI; <https://doi.org/10.3390/app13042733;> <https://www.mdpi.com/journal/applsci.>.

* cited by examiner

TRAJECTORY CONTROL SYSTEM FOR AUTOMATED DRIVING INCLUDING FEEDFORWARD AND MODEL PREDICTIVE CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to automated driving systems for vehicles, and more particularly to a trajectory control system for a vehicle using feedforward control and model predictive control.

Automated driving systems for vehicles control acceleration, steering/trajectory, and braking of a vehicle without user input. The automated driving systems include one or more sensors such as cameras, light detecting and ranging (lidar) sensors, and/or radio detecting and ranging (radar) sensors. The sensors are used to detect objects in the path of the vehicle and to identify lane lines.

SUMMARY

A vehicle includes an electronic power steering (EPS) system configured to steer front wheels of the vehicle in response to a steering command. A trajectory control module is configured to generate the steering command. The trajectory control module includes a perception module configured to identify a target path for the vehicle and a planning module configured to determine a blend path for the vehicle to the target path. A control module includes a feedforward module configured to generate a feedforward steering command, a model predictive control module configured to generate a feedback steering command in response to the feedforward steering command and model predictive control, and a summer configured to generate the steering command in response to a sum of the feedforward steering command and the feedback steering command.

In other features, the model predictive control module generates the feedback steering command in response a cost function. The cost function is based on a lateral position error, a lateral velocity error, a heading error, and a yaw rate error. The cost function is further based on first weights for the lateral position error, second weights for the lateral velocity error, third weights for the heading error, and fourth weights for the yaw rate error.

In other features, the model predictive control module generates the feedback steering command in response to cost calculations based on $$V = \frac{1}{2}\sum_{k=1}^{p}\Big\{(y - y_{ref})^2 W_y + \left(v_y - v_{y_{ref}}\right)^2 W_{v_y} + (\psi - \psi_{ref})^2 W_\psi + \left(\dot{\psi} - \dot{\psi}_{ref}\right)^2 W_{\dot{\psi}} + (u - u_{ref})^2 W_u + (u_k - u_{k-1})^2 W_{\Delta u} + \epsilon^2 W_\epsilon\Big\}.$$

where V is a cost function, y is a lateral position of the vehicle, u is a measured steering angle, $u_{ref}$ is a trajectory angle command, $W_y$ is a weight for lateral position error, $W_{v_y}$ is a weight for lateral velocity error, $W_\psi$ is a weight for heading error, $W_{\dot{\psi}}$ is a yaw rate error, $W_u$ is a command error weight, $W_{\Delta u}$ is a command rate weight, $\epsilon$ is a constant, and $W_\epsilon$ is a weight for $\varepsilon$, $u_k$ is a current iteration of the steering command, $u_{k-1}$ is a prior iteration of the steering command, and p is a constant.

The feedforward module generates the feedforward steering command based on:

$$-k'_\kappa\left(L + K_{us}v_x^2\right)\left[\frac{6}{x_{mp}^2}(1 - 2r_{LA})\ \ 0\ \ \frac{2}{x_{mp}}(2 - 3r_{LA})\ \ 0\right]e + k_\kappa\left(L + K_{us}v_x^2\right)\kappa_d$$

where $k'_\kappa$ is a curvature error gain, $\kappa_{BP}$ is a curvature of a blend path, L is a wheelbase of the vehicle, $K_{us}$ is a learned understeer coefficient, $V_x$ is a longitudinal speed, $\kappa_d$ is a desired curvature, $x_{mp}$ is a merge point distance to a blend path, $r_{LA}$ is equal to $x_c/x_{mp}$, e is an error matrix, and $x_c$ is a distance to a location between the vehicle and $x_{mp}$.

In other features, a camera generates images in a path of the vehicle. The perception module performs processing on the images to identify lane lines. The perception module determines the target path in response to the lane lines.

A method for controlling a trajectory of a vehicle includes identifying a target path for the vehicle; determining a blend path for the vehicle to the target path; generating a feedforward steering command; generating a feedback steering command in response to the feedforward steering command and model predictive control; summing the feedforward steering command and the feedback steering command to generate a steering command; and controlling a steering system of the vehicle in response to the steering command.

In other features, the feedback steering command is based on a cost function. The cost function is based on a lateral position error, a lateral velocity error, a heading error, and a yaw rate error. The cost function is further based on first weights for the lateral position error, second weights for the lateral velocity error, third weights for the heading error, and fourth weights for the yaw rate error.

In other features, the feedback steering command in response to cost calculations based on $$V = \frac{1}{2}\sum_{k=1}^{p}\Big\{(y - y_{ref})^2 W_y + \left(v_y - v_{y_{ref}}\right)^2 W_{v_y} + (\psi - \psi_{ref})^2 W_\psi + \left(\dot{\psi} - \dot{\psi}_{ref}\right)^2 W_{\dot{\psi}} + (u - u_{ref})^2 W_u + (u_k + u_{k-1})^2 W_{\Delta u} + \epsilon^2 W_\epsilon\Big\}.$$

where V is a cost function, y is a lateral position of the vehicle, u is a measured steering angle, $u_{ref}$ is a steering angle command, $W_y$ is a weight for lateral position error, $W_{v_y}$ is a weight for lateral velocity error, $W_\psi$ is a weight for heading error, $W_{\dot{\psi}}$ is a yaw rate error, $W_u$ is a command error weight, $W_{\Delta u}$ is a command rate weight, $\epsilon$ is a constant, and $W_\epsilon$ is a weight for $\varepsilon$, $u_k$ is a current iteration of the steering command, the $u_{k-1}$ is a prior iteration of the steering command, and p is a constant.

In other features, the feedforward steering command is based on:

$$-k'_\kappa\left(L + K_{us}v_x^2\right)\left[\frac{6}{x_{mp}^2}(1 - 2r_{LA})\ \ 0\ \ \frac{2}{x_{mp}}(2 - 3r_{LA})\ \ 0\right]e + k_\kappa\left(L + K_{us}v_x^2\right)\kappa_d$$

where $k'_\kappa$ is a curvature error gain, $\kappa_{BP}$ is a curvature of a blend path, L is a wheelbase of the vehicle, $K_{us}$ is a learned understeer coefficient, $V_x$ is a longitudinal speed, $\kappa_d$ is a desired curvature, $x_{mp}$ is a merge point distance to a blend path, $r_{LA}$ is equal to $x_c/x_{mp}$, e is an error matrix, and $x_c$ is a distance to a location between the vehicle and $x_{mp}$.

In other features, the method includes generating images in a path of the vehicle. The method includes performing image processing on the images to identify lane lines. The method includes determining the target path in response to the lane lines.

A trajectory control system for a vehicle includes a feedforward module configured to generate a feedforward steering command and a model predictive control module configured to generate a feedback steering command in response to the feedforward steering command and model predictive control. A summer is configured to sum the feedforward steering command and the feedback steering command to generate a steering command. An electronic power steering (EPS) system is configured to adjust a steering angle of wheels of the vehicle in response to the steering command.

In other features, the feedforward module generates the feedforward steering command based on:

$$-k'_\kappa\left(L + K_{us}v_x^2\right)\left[\frac{6}{x_{mp}^2}(1-2r_{LA})\ 0\ \frac{2}{x_{mp}}(2-3r_{LA})\ 0\right]e + k_\kappa\left(L + K_{us}v_x^2\right)\kappa_d$$

where $k'_\kappa$ is a curvature error gain, $\kappa_{BP}$ is a curvature of a blend path, L is a wheelbase of the vehicle, $K_{us}$ is a learned understeer coefficient, $V_x$ is a longitudinal speed, $\kappa_d$ is a desired curvature, $x_{mp}$ is a merge point distance to a blend path, $r_{LA}$ is equal to $x_c/x_{mp}$, e is an error matrix, and $x_c$ is a distance to a location between the vehicle and $x_{mp}$.

In other features, the model predictive control module generates the feedback steering command in response to cost calculations based on:

$$V = \frac{1}{2}\sum_{k=1}^{p}\Big\{(y - y_{ref})^2 W_y + \left(v_y - v_{y_{ref}}\right)^2 W_{v_y} + (\psi - \psi_{ref})^2 W_\psi + (\dot{\psi} - \dot{\psi}_{ref})^2 W_{\dot{\psi}} + (u - u_{ref})^2 W_u + (u_k + u_{k-1})^2 W_{\Delta u} + \epsilon^2 W_\epsilon\Big\}.$$

where V is a cost function, y is a lateral position of the vehicle, u is a measured steering angle, $u_{ref}$ is a steering angle command, $W_y$ is a weight for lateral position error, $W_{v_y}$ is a weight for lateral velocity error, $W_\psi$ is a weight for heading error, $W_{\dot{\psi}}$ is a yaw rate error, $W_u$ is a command error weight, $W_{v_y}$ is a command rate weight, $\epsilon$ is a constant, and $W_\epsilon$ is a weight for $\epsilon$, $u_k$ is a current iteration of the steering command, $u_{k-1}$ is a prior iteration of the steering command, and p is a constant.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may use model predictive control (MPC) to calculate a control command (such as a trajectory adjustment to an electronic power steering (EPS) system) based on a predicted vehicle behavior calculated from a given model. In theory, MPC has the capability to better optimize trajectory tracking by performing optimization over a prediction horizon. In reality, MPC is limited by the one or more prediction model(s) that are used. Any uncertainty of the prediction model(s) implemented by MPC and/or inputs can cause over-regression and/or sub-optimal tracking performance.

The present disclosure relates to a trajectory control system for a vehicle using a feedforward control and MPC. More particularly, a trajectory control module incorporates nonlinear parallel feed forward to navigate the vehicle proactively. Feedforward control generates a small trajectory error. The trajectory control module uses MPC to reduce the trajectory error. The trajectory control module evolves existing nonlinear control strategies by integrating the benefits of MPC.

Figure 1B:
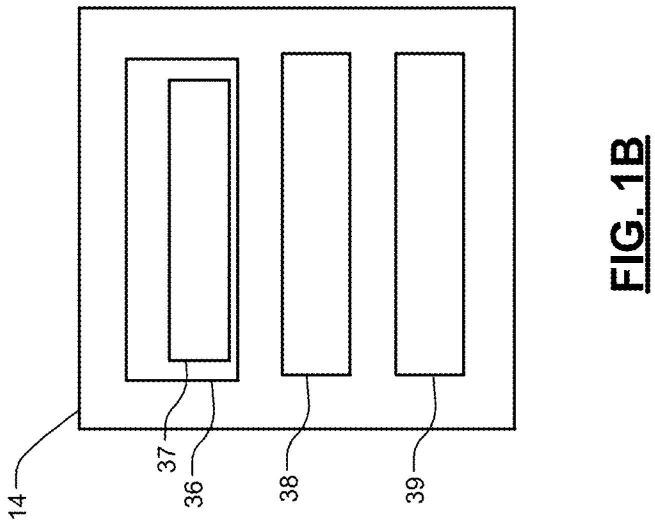
FIG. 1B is a functional block diagram of an example of a trajectory control module according to the present disclosure.
Figure 1A:
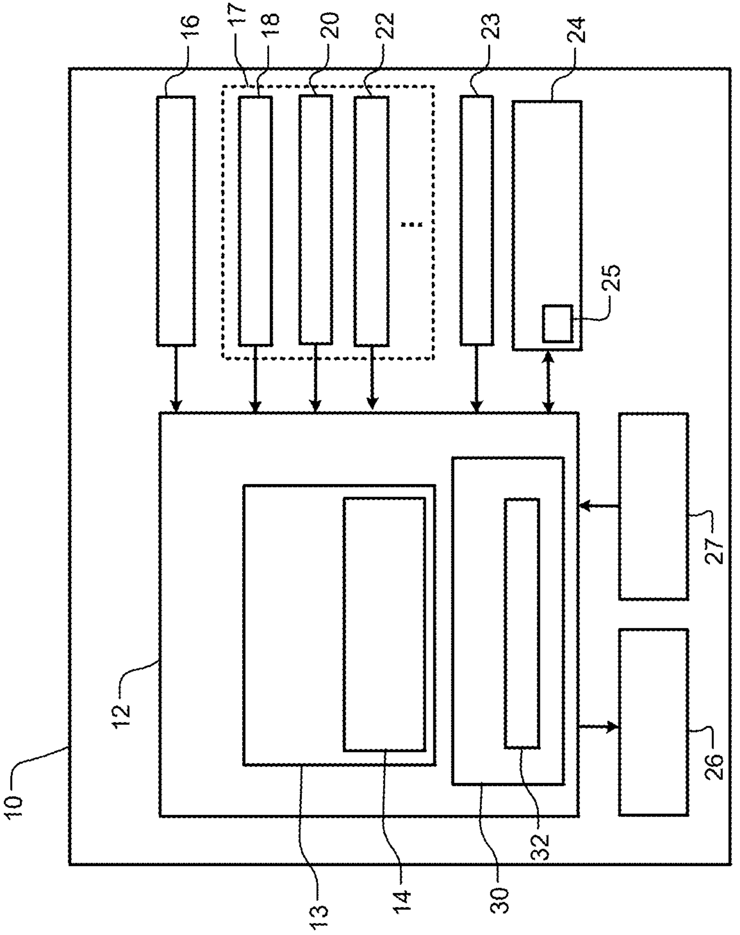
FIG. 1A is a functional block diagram of an example of a vehicle including a driver assistance module including a trajectory control module using feedforward and model predictive control (MPC) according to the present disclosure.

Referring now to FIG. 1A, a vehicle 10 includes a controller 12 including a driver assistance module 13 including a trajectory control module 14 configured to control an electronic power steering (EPS) 24 of a vehicle. The trajectory control module 14 incorporates the nonlinear parallel feed forward module and MPC to close the loop on the trajectory error.

The vehicle 10 includes a global positioning system (GPS) 16 configured to sense a position of the vehicle. The vehicle 10 includes sensors 17 such as a light detection and ranging (lidar) sensor 18, a radio detection and ranging (radar) sensor 20, an inertial measurement unit 22, one or more cameras 23, and/or other vehicle sensors 27. The EPS 24 includes a sensor 25 configured to sense trajectory such as a steering angle. The vehicle 10 includes control inputs 26 such as an accelerator pedal position, steering wheel angle (if a steering wheel is used), brake pedal position, and/or other control inputs. A navigation module 30 is configured to receive location data from the GPS and to generate routes for the vehicle using maps 32.

In FIG. 1B, the trajectory control module 14 includes a perception module 36, a planning module 38, and a control module 40. The perception module 36 includes an image processing module 37 to perform image processing on images from the one or more cameras 23.

Figure 1E:
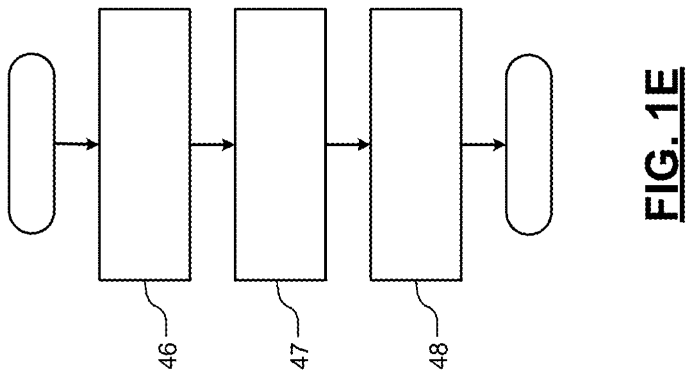
FIGS. 1C to 1E are examples of methods performed by the perception module, the planning module, and the control module of the trajectory control module according to the present disclosure.
Figure 1D:
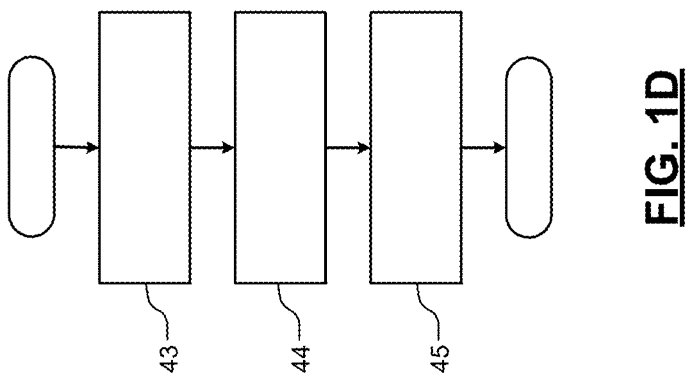
Figure 1C:
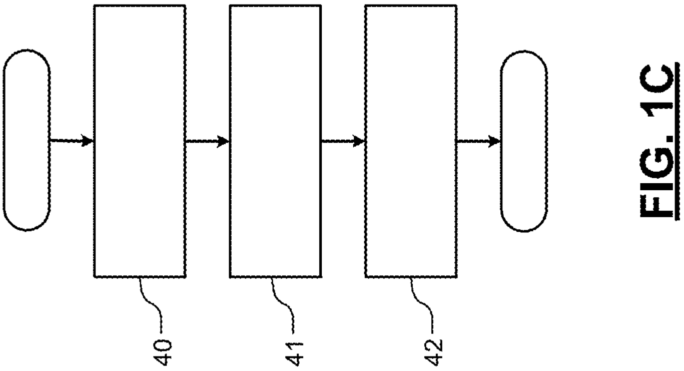

In FIGS. 1C to 1E, a portion of the high level steps performed by the perception module 36, the planning module 38, and the control module 39 are shown. In FIG. 1C, the perception module 36 collects information from the vehicle sensors 17, 25, and 27 and cameras 23 such as lane line locations, vehicle position (x (longitudinal) and y (lateral)), speed ($v_x$ and $v_y$), heading ($\psi$) yaw rate ($\dot{\psi}$), etc. at 40. The perception module 36 determines locations of lane lines at 41. The perception module 36 (and/or the planning module 38) use the perceived lane lines or other perceived objects in the path of the vehicle to determine a target path for the vehicle 10 at 42.

In FIG. 1D, the planning module 38 receives vehicle parameters at 43 and determines a blend path from the current vehicle path to the target path at 44. At 45, the planning module 38 identifies positions $x_c$ and $x_{mp}$ described further below.

The control module 39 determines a steering command that will cause the vehicle to move along the blend path towards the target path. The control module 40 uses both feedforward and model predictive control to generate the steering command. At 46, the control module 39 determines feedforward steering input using a model. At 47, the control module 39 uses MPC to determines feedback steering input using the feedforward input. At 48, the control module 39 sums the feedforward and feedback steering inputs. The steering command is output to the EPS 24 and the process begins again.

Figure 2:
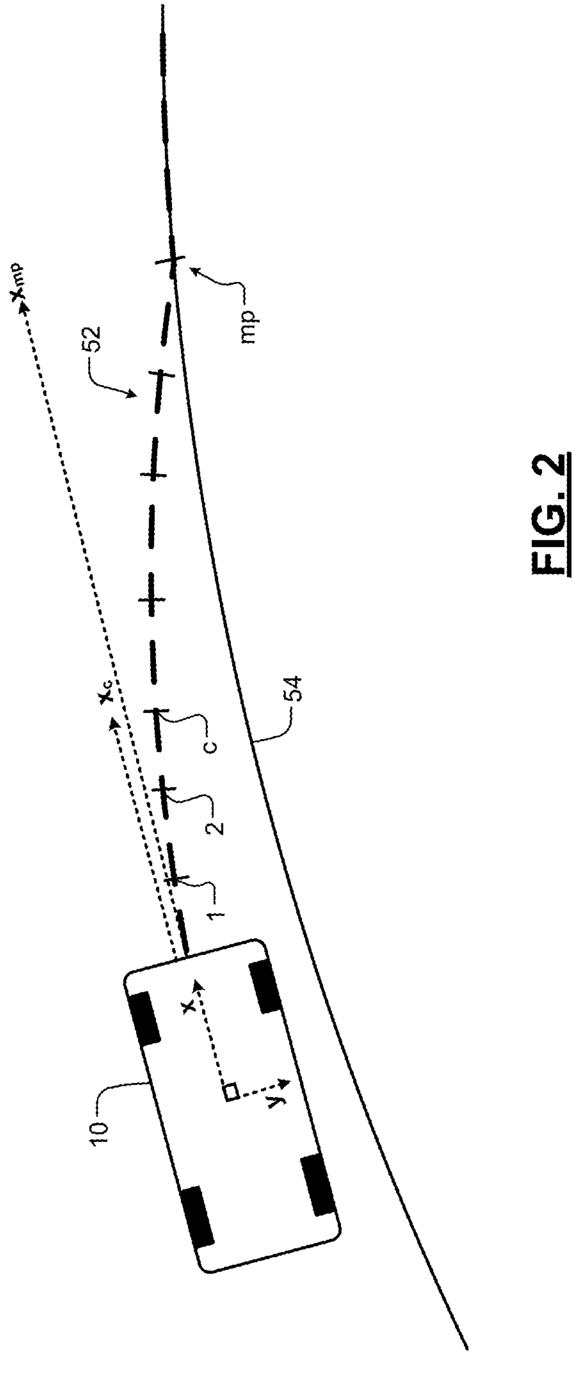
FIG. 2 illustrates an example of a vehicle path and a target path.

Referring now to FIG. 2, a vehicle 10 is shown travelling along a blend path (BP) 42 relative to a target path 44. The vehicle 10 moves longitudinally along an x axis and laterally along a y axis at velocities $v_x$ and $v_y$. The vehicle has a heading $\psi$ and yaw rate ($\dot{\psi}$). The trajectory control module 14 steers the vehicle along the blend path 42 to the target path 44.

The blend path 42 corresponds to a path from the vehicle 10 to the target path 44. The blend path 42 and the target path 44 merge at a merge point (mp) located at a merge point distance ($x_{mp}$) in front of the vehicle. $x_{mp}$ is calibrated value that is adjusted based on one or more vehicle states (velocity, curvature, etc.) and/or on one or more environmental states (road friction, road type, weather, etc.). The blend path and the merge point distance $x_{mp}$ are selected to allow smooth trajectory inputs while reducing or minimizing the difference between the current vehicle path and the target path.

During a control iteration, the trajectory control module 14 selects a position $x_c$ located along the blend path 42 between the vehicle 10 and the merge point distance $x_{mp}$. As will be described further below, the trajectory control module 14 attempts to select a trajectory or steering input that will minimize trajectory errors (e.g., a lateral position error $e_y$, a lateral speed error $e_{v_y}$, a heading error $e_\psi$, a yaw rate error $e_{\dot{\psi}}$, etc.). The lateral position error $e_y$ is equal to a lateral position reference $y_{ref}$ minus a lateral position y of the vehicle, the lateral velocity error $e_{v_y}$ is equal to a lateral velocity reference $v_{y_{ref}}$ minus a lateral velocity $v_y$ of the vehicle, and so on.

More particularly, the distance between the current vehicle location and the merge point $x_{mp}$ is divided into future vehicle positions 1, 2, 3, . . . corresponding to successive locations between the vehicle and $x_{mp}$. The future vehicle positions 1, 2, 3, . . . , corresponds to distances $x_1$, $x_2$, . . . , and $x_{mp}$ along the blend path 42 from the vehicle 10 to the merge point distance ($x_{mp}$).

One of the future vehicle positions c of the vehicle is located at a distance $x_c$ (between the current vehicle position and $x_{mp}$). $x_c$ and $x_{mp}$ are calibrated values. The lateral position reference $y_{ref}$, the lateral velocity reference, the heading reference $\psi_{ref}$, and/or other reference values are determined for $x_c$. A reference value $$r_{LA} = \frac{x_c}{x_{mp}}$$

is calculated. The trajectory control module 14 seeks to minimize trajectory errors such as a lateral position error $e_y$, lateral speed error e, heading error $e_\psi$, yaw rate error $e_{\dot{\psi}}$, etc.

When using MPC, the vehicle driver assistance controller has multiple objectives when attempting to follow the desired trajectory. MPC is designed to minimize a cost function rather than to control the various error values. In other words, when the MPC model has multiple objectives, none of the specific objectives can be explicitly controlled which may lead to less precise control of the trajectory or steering angle of the vehicle than desired.

Figure 3:
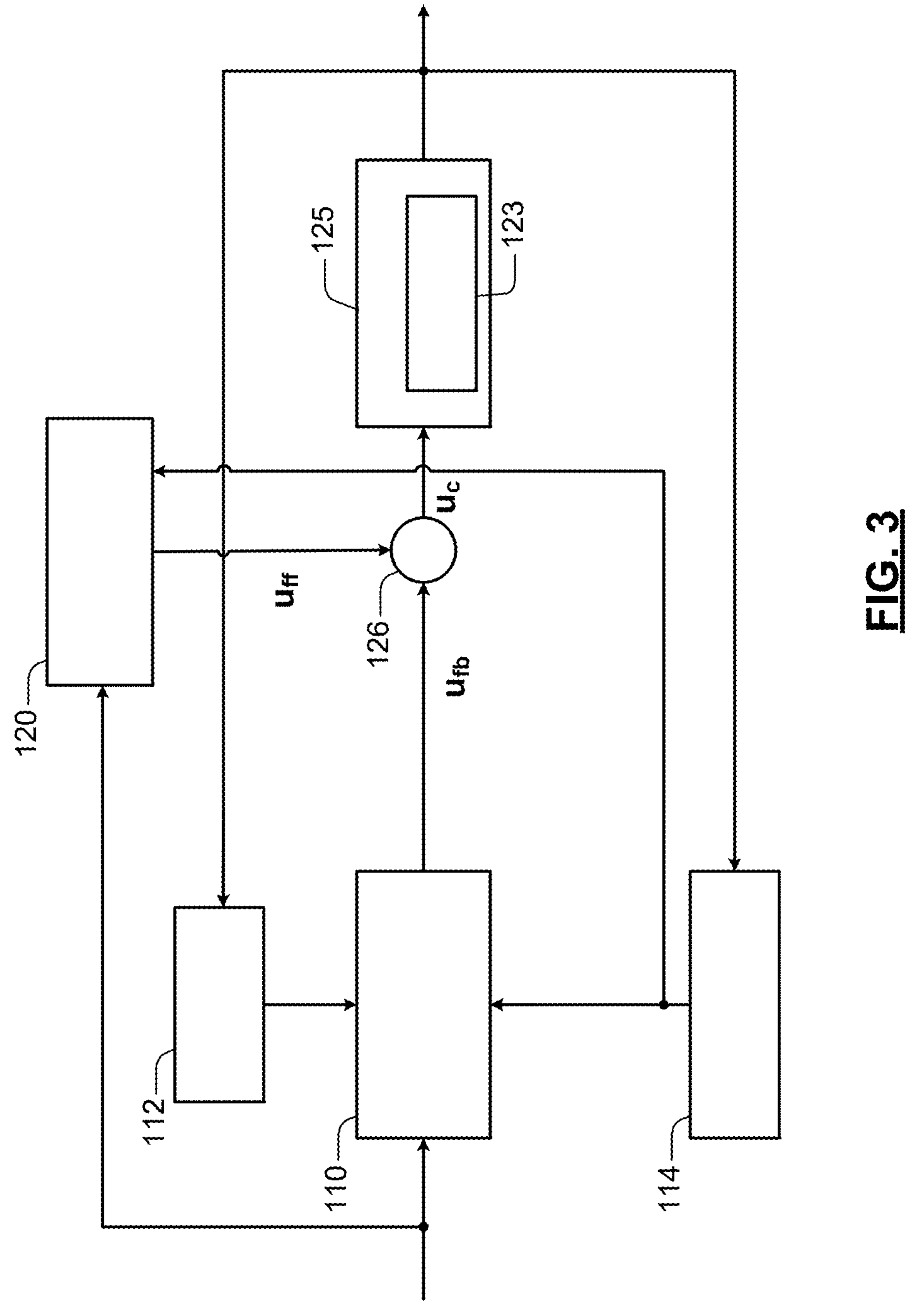
FIG. 3 is a functional block diagram of an example of a trajectory control system using feedforward control and MPC according to the present disclosure.

Referring now to FIG. 3, operation of the trajectory control module 14 is shown in further detail. A feedforward module 120 generates a trajectory or steering a nonlinear parallel feed forward signal u that navigates the vehicle proactively. Use of the feedforward signal $u_{ff}$ causes a small trajectory error. The trajectory control module 14 uses the MPC module 110 to generate a feedback signal urb to reduce the trajectory error.

The MPC module 110 receives inputs. The MPC module 110 receives sensed or calculated outputs via a constraint module 112 configured to apply one or more constraints on the outputs. An output of the constraints module 112 is input to the MPC module 110. The constraints module 112 applies hard or soft constraints such as limits on steering angle. The outputs are also fed back to a vehicle model adaptation module 114 that generates learned values such as $K_{us}$ corresponding to a learned understeer coefficient.

An output of the vehicle model adaptation module 114 is fed to the state and distance estimation module 116 and to the feedforward module 120. An output of the state and distance estimation module is fed to the MPC module 110.

The MPC module 110 generates a trajectory output $u_{fb}$ that is input to a summer 126. The feedforward module 120 generates a feedforward value $u_{ff}$. The feedforward value $u_{ff}$ is also output to the summer 126. An output of the summer 126 is fed to an electronic power steering system (EPS) 123 of a vehicle 125.

Consider an unconstrainted MPC optimization problem with a single horizon point:

$$V = \frac{1}{2}\sum_{k=1}^{1}\Big\{(y - y_{ref})^2 W_y + \left(v_y - v_{y_{ref}}\right)^2 W_{v_y} + (\psi - \psi_{ref})^2 W_\psi + \left(\dot{\psi} - \dot{\psi}_{ref}\right)^2 W_{\dot{\psi}} + (u - u_{ref})^2 W_u + (u_k + u_{k-1})^2 W_{\Delta u} + \epsilon^2 W_\epsilon\Big\}$$

Where V is an MPC cost function, y is a lateral position of the vehicle, u is a measured steering angle, $u_{ref}$ is a steering angle command (corresponding to the feedforward value $u_{ff}$), $W_y$ is a weight for lateral position error, $W_{v_y}$ is a weight for lateral velocity error, $W_\psi$ is a weight for heading error, $W_{\dot{\psi}}$ is a yaw rate error, $W_u$ is a command error weight, $W_{\Delta u}$ is a command rate weight, $\epsilon$ is a constant, and $W_\epsilon$ is a weight for $\epsilon$, $u_k$ is the current iteration steering input, and the $u_{k-1}$ is the prior iteration steering input.

If we ignore $\epsilon^2 W_\epsilon$, the solution is the mere full state feedback with weights amounting to placement gains as follows:

$$\delta_{fb} = -Ke$$

Where K is a matrix including feedback gains and e is an error vector. In other words, the error vector includes lateral position error $e_y$, lateral velocity error $e_{v_y}$ or $\dot{e}_y$, heading error $e_\psi$, and yaw rate error $\dot{e}_\psi$.

$$\delta_{fb} = K_y e_y + K_y \dot{e}_y + K_y e_\psi + K_y \dot{e}_\psi$$

Where $\delta_{fb}$ is a feedback control input, $K_y$ is an output error gain matrix.

This equation describes two classic proportional derivative (PD) controllers. An overall control input can be assumed to be $\delta = \delta_{ff} + \delta_{fb}$, where:

$$\begin{aligned}\delta_{ff} &= k'_\kappa \kappa_{BP} = k_\kappa (L + K_{us} V_x^2) \kappa_{BP} \\ &= -k_\kappa (L + K_{us} V_x^2) \underbrace{\left[ \frac{6}{x_{mp}^2}(1 - 2r_{LA}) \ 0 \ \frac{2}{x_{mp}}(2 - 3r_{LA}) \ 0 \right]}_{K_\kappa} e \\ &\quad + k_\kappa (L + K_{us} V_x^2) \kappa_d\end{aligned}$$

Where $\delta$ is an overall control input, $\delta_{ff}$ is a feedforward control input, $k'_\kappa$ is a curvature error gain, $\kappa_{BP}$ is a curvature of a blend path, L is a wheelbase of the vehicle, $K_{us}$ is a learned understeer coefficient, $V_x$ is a longitudinal speed, $\kappa_d$ is a desired curvature (an input).

Since $\delta_{ff}$ is also of the form $\delta_{ff} = -k'_\kappa K_\kappa e$, an overall stable error dynamic of $\dot{e} = (A - K'_\kappa B_1) e$ is achievable (where A is a system matrix that is a function of vehicle parameters, $B_1$ is a matrix describing the system, $K'_\kappa$ is a gain matrix for feedforward control, and e is a derivative of the error vector).

Figure 4:
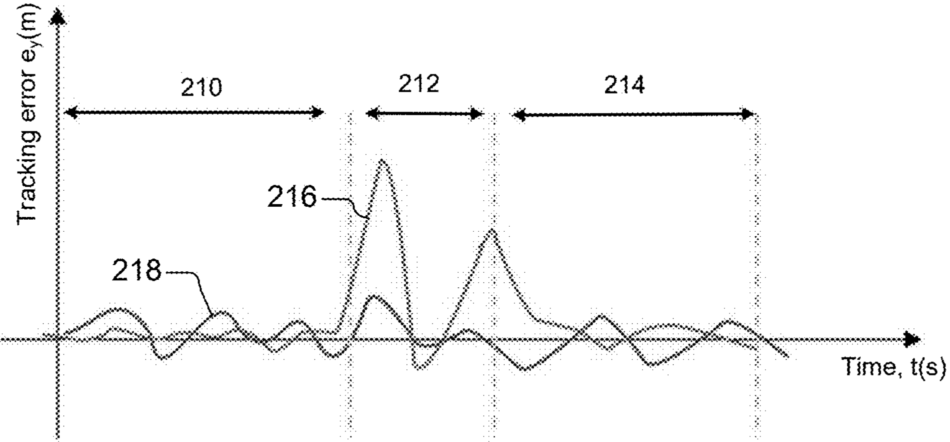
FIG. 4 is a graph illustrating an example of control of the trajectory of the vehicle using MPC or feedforward control.
Figure 5:
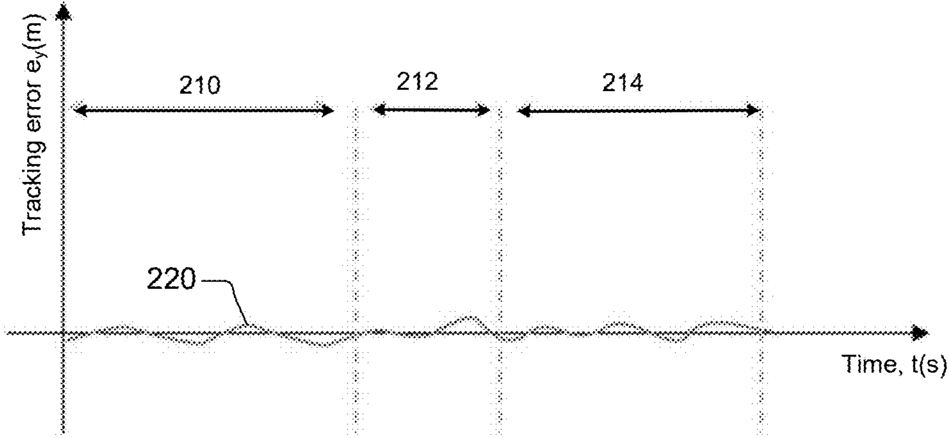
FIG. 5 is a graph illustrating an example of control of trajectory of a vehicle using feedforward control to proactively control the trajectory and MPC to reduce trajectory error according to the present disclosure.

Referring now to FIGS. 4 and 5, a vehicle is shown along a path including a straight section at 210, a curve entry at 212, and a steady curve at 214. In FIG. 6, feedforward control is shown at 218 and MPC control is shown at 216. In FIG. 7, both feedforward control and MPC control are used at 220. As can be appreciated, the tracking error is reduced.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle comprising:

an electronic power steering (EPS) system configured to steer front wheels of the vehicle in response to a steering command; and a trajectory control module configured to generate the steering command and including:

a perception module configured to identify a target path for the vehicle;

a planning module configured to determine a blend path for the vehicle to the target path; and a control module including:

a feedforward module configured to generate a feedforward steering command;

a model predictive control module configured to generate a feedback steering command in response to the feedforward steering command, model predictive control, and a cost function, wherein the cost function is based on a lateral position error, a lateral velocity error, a heading error, a yaw rate error, a first weight for the lateral position error, a second weight for the lateral velocity error, a third weight for the heading error, and a fourth weight for the yaw rate error; and a summer configured to generate the steering command in response to a sum of the feedforward steering command and the feedback steering command.

2. The vehicle of claim 1, wherein the model predictive control module generates the feedback steering command in response to cost calculations based on:

$$V=\frac{1}{2}\sum_{k=1}^{p}\left\{(y-y_{ref})^2W_y+\left(v_y-v_{y_{ref}}\right)^2W_{v_y}+(\psi-\psi_{ref})^2W_\psi+(\dot{\psi}-\dot{\psi}_{ref})^2W_{\dot{\psi}}+(u-u_{ref})^2W_u+(u_k+u_{k-1})^2W_{\Delta u}+\epsilon^2W_\epsilon\right\}$$

where V is a cost function, y is a lateral position of the vehicle, u is a measured steering angle, $u_{ref}$ is a trajectory angle command, $W_y$ is a weight for lateral position error, $W_{v_y}$ is a weight for lateral velocity error, $W_\psi$ is a weight for heading error, $W_{\dot{\psi}}$ is a yaw rate error, $W_u$ is a command error weight, $W_{\Delta u}$ is a command rate weight, $\epsilon$ is a constant, and $W_\epsilon$ is a weight for $\epsilon$, $u_k$ is a current iteration of the steering command, the $u_{k-1}$ is a prior iteration of the steering command, and p is a constant.

3. The vehicle of claim 1, wherein the feedforward module generates the feedforward steering command based on:

$$-k_\kappa'\left(L+K_{us}v_x^2\right)\left[\frac{6}{x_{mp}^2}(1-2r_{LA})\ 0\ \frac{2}{x_{mp}}(2-3r_{LA})\ 0\right]e+k_\kappa\left(L+K_{us}v_x^2\right)\kappa_d$$

where $k_k'$ is a curvature error gain, $\kappa_{BP}$ is a curvature of a blend path, L is a wheelbase of the vehicle, $K_{us}$ is a learned understeer coefficient, $V_x$ is a longitudinal speed, $\kappa_d$ is a desired curvature, $x_{mp}$ is a merge point distance to a blend path, $r_{LA}$ is equal to $x_c/x_{mp}$, e is an error matrix, and $x_c$ is a distance to a location between the vehicle and $x_{mp}$.

4. The vehicle of claim 1, further comprising a camera generating images in a path of the vehicle.

5. The vehicle of claim 4, wherein the perception module performs processing on the images to identify lane lines.

6. The vehicle of claim 5, wherein the perception module determines the target path in response to the lane lines.

7. The vehicle of claim 6, wherein the model predictive control module generates the feedback steering command in response to cost calculations based on:

$$V = \frac{1}{2}\sum_{k=1}^{p}\left\{(y - y_{ref})^2 W_y + \left(v_y - v_{y_{ref}}\right)^2 W_{v_y} + (\psi - \psi_{ref})^2 W_\psi + (\dot{\psi} - \dot{\psi}_{ref})^2 W_{\dot{\psi}} + (u - u_{ref})^2 W_u + (u_k - u_{k-1})^2 W_{\Delta u} + \epsilon^2 W_\epsilon\right\},$$

where V is a cost function, y is a lateral position of the vehicle, u is a measured steering angle, $u_{ref}$ is a trajectory angle command, $W_y$ is a weight for lateral position error, $W_{v_y}$ is a weight for lateral velocity error, $W_\psi$ is a weight for heading error, $W_{\dot{\psi}}$ is a yaw rate error, $W_u$ is a command error weight, $W_{\Delta u}$ is a command rate weight, $\epsilon$ is a constant, and $W_\epsilon$ is a weight for $\epsilon$, $u_k$ is a current iteration of the steering command, the $u_{k-1}$ is a prior iteration of the steering command, and p is a constant.

8. The vehicle of claim 6, wherein the feedforward module generates the feedforward steering command based on:

$$-k'_\kappa\left(L + K_{us}v_x^2\right)\left[\frac{6}{x_{mp}^2}(1 - 2r_{LA})\ 0\ \frac{2}{x_{mp}}(2 - 3r_{LA})\ 0\right]e + k_\kappa\left(L - K_{us}v_x^2\right)\kappa_d,$$

where $k_\kappa'$ is a curvature error gain, $\kappa_{BP}$ is a curvature of a blend path, L is a wheelbase of the vehicle, $K_{us}$ is a learned understeer coefficient, $V_x$ is a longitudinal speed, $\kappa_d$ is a desired curvature, $x_{mp}$ is a merge point distance to a blend path, $r_{LA}$ is equal to $x_c/x_{mp}$, e is an error matrix, and $x_c$ is a distance to a location between the vehicle and $x_{mp}$.

9. A method for controlling a trajectory of a vehicle, comprising:

identifying a target path for the vehicle;

determining a blend path for the vehicle to the target path;

generating a feedforward steering command;

generating a feedback steering command in response to the feedforward steering command and model predictive control, wherein the feedback steering command is based on a cost function and the cost function is based on a lateral position error, a lateral velocity error, a heading error, a yaw rate error, a first weight for the lateral position error, a second weight for the lateral velocity error, a third weight for the heading error, and a fourth weight for the yaw rate error;

summing the feedforward steering command and the feedback steering command to generate a steering command; and controlling a steering system of the vehicle in response to the steering command.

10. The method of claim 9, wherein the feedback steering command in response to cost calculations based on;

$$V = \frac{1}{2}\sum_{k=1}^{p}\left\{(y - y_{ref})^2 W_y + \left(v_y - v_{y_{ref}}\right)^2 W_{v_y} + (\psi - \psi_{ref})^2 W_\psi + (\dot{\psi} - \dot{\psi}_{ref})^2 W_{\dot{\psi}} + (u - u_{ref})^2 W_u + (u_k + u_{k-1})^2 W_{\Delta u} + \epsilon^2 W_\epsilon\right\}$$

where V is a cost function, y is a lateral position of the vehicle, u is a measured steering angle, $u_{ref}$ is a steering angle command, $W_y$ is a weight for lateral position error, $W_{v_y}$ is a weight for lateral velocity error, $W_\psi$ is a weight for heading error, $W_{\dot{\psi}}$ is a yaw rate error, $W_u$ is a command error weight, $W_{\Delta u}$ is a command rate weight, $\epsilon$ is a constant, and $W_\epsilon$ is a weight for $\epsilon$, $u_k$ is a current iteration of the steering command, the $u_{k-1}$ is a prior iteration of the steering command, and p is a constant.

11. The method of claim 9, wherein the feedforward steering command is based on:

$$-k'_\kappa\left(L + K_{us}v_x^2\right)\left[\frac{6}{x_{mp}^2}(1 - 2r_{LA})\ 0\ \frac{2}{x_{mp}}(2 - 3r_{LA})\ 0\right]e + k_\kappa\left(L + K_{us}v_x^2\right)\kappa_d$$

where $k_k'$ is a curvature error gain, $K_{BP}$ is a curvature of a blend path, L is a wheelbase of the vehicle, $K_{us}$ is a learned understeer coefficient, $V_x$ is a longitudinal speed, $\kappa_d$ is a desired curvature, $x_{mp}$ is a merge point distance to a blend path, $n_{LA}$ is equal to $x_c/x_{mp}$, e is an error matrix, and $x_c$ is a distance to a location between the vehicle and $x_{mp}$.

12. The method of claim 9, further comprising generating images in a path of the vehicle.

13. The method of claim 12, further comprising performing image processing on the images to identify lane lines.

14. The method of claim 13, further comprising determining the target path in response to the lane lines.

15. The method of claim 14, wherein the feedback steering command in response to cost calculations based on:

$$V = \frac{1}{2}\sum_{k=1}^{p}\left\{(y - y_{ref})^2 W_y + \left(v_y - v_{y_{ref}}\right)^2 W_{v_y} + (\psi - \psi_{ref})^2 W_\psi + (\dot{\psi} - \dot{\psi}_{ref})^2 W_{\dot{\psi}} + (u - u_{ref})^2 W_u + (u_k - u_{k-1})^2 W_{\Delta u} + \epsilon^2 W_\epsilon\right\},$$

where V is a cost function, y is a lateral position of the vehicle, u is a measured steering angle, $u_{ref}$ is a steering angle command, $W_y$ is a weight for lateral position error, $W_{v_y}$ is a weight for lateral velocity error, $W_\psi$ is a weight for heading error, $W_{\dot{\psi}}$ is a yaw rate error, $W_u$ is a command error weight, $W_{\Delta u}$ is a command rate weight, $\epsilon$ is a constant, and $W_\epsilon$ is a weight for $\epsilon$, $u_k$ is a current iteration of the steering command, the $u_{k-1}$ is a prior iteration of the steering command, and p is a constant.

16. The method of claim 14, wherein the feedforward steering command is based on:

$$-k'_\kappa\left(L + K_{us}v_x^2\right)\left[\frac{6}{x_{mp}^2}(1 - 2r_{LA})\ 0\ \frac{2}{x_{mp}}(2 - 3r_{LA})\ 0\right]e + k_\kappa\left(L - K_{us}v_x^2\right)\kappa_d,$$

where $k_k'$ is a curvature error gain, $\kappa_{BP}$ is a curvature of a blend path, L is a wheelbase of the vehicle, $K_{us}$ is a learned understeer coefficient, $V_x$ is a longitudinal speed, $\kappa_d$ is a desired curvature, $x_{mp}$ is a merge point distance to a blend path, $n_{LA}$ is equal to $x_c/x_{mp}$, e is an error matrix, and $x_c$ is a distance to a location between the vehicle and $x_{mp}$.

17. A trajectory control system for a vehicle, comprising:

a feedforward module configured to generate a feedforward steering command;

a model predictive control module configured to generate a feedback steering command in response to the feedforward steering command and model predictive control;

a summer configured to sum the feedforward steering command and the feedback steering command to generate a steering command; and an electronic power steering (EPS) system configured to adjust a steering angle of wheels of the vehicle in response to the steering command, wherein the feedforward module generates the feedforward steering command based on:

$$-k_{\kappa}'\left(L+K_{us}v_x^2\right)\left[\frac{6}{x_{mp}^2}(1-2r_{LA})\ 0\ \frac{2}{x_{mp}}(2-3r_{LA})\ 0\right]e+k_{\kappa}\left(L+K_{us}v_x^2\right)\kappa_d$$

where $k_k$' is a curvature error gain, $\kappa_{BP}$ is a curvature of a blend path, L is a wheelbase of the vehicle, $K_{us}$ is a learned understeer coefficient, $V_x$ is a longitudinal speed, $\kappa_d$ is a desired curvature, $x_{mp}$ is a merge point distance to a blend path, $r_{LA}$ is equal to $x_c/x_{mp}$, e is an error matrix, and $x_c$ is a distance to a location between the vehicle and $x_{mp}$, and wherein the model predictive control module generates the feedback steering command in response to cost calculations based on:

$$V=\frac{1}{2}\sum_{k=1}^{p}\left\{(y-y_{ref})^2W_y+\left(v_y-v_{y_{ref}}\right)^2W_{v_y}+(\psi-\psi_{ref})^2W_{\psi}+(\dot{\psi}-\dot{\psi}_{ref})^2W_{\dot{\psi}}+(u-u_{ref})^2W_u+(u_k+u_{k-1})^2W_{\Delta u}+\epsilon^2W_{\epsilon}\right\}$$

where V is a cost function, y is a lateral position of the vehicle, u is a measured steering angle, $u_{ref}$ is a steering angle command, $W_y$ is a weight for lateral position error, $W_{Vy}$ is a weight for lateral velocity error, $W_{\psi}$ is a weight for heading error, $W_{\dot{\psi}}$ is a yaw rate error, $W_u$ is a command error weight, $W_{\Delta u}$ is a command rate weight, $\epsilon$ is a constant and $W_{\epsilon}$ is a weight for $\epsilon$, $u_k$ is a current iteration of the steering command, $u_{k-1}$ is a prior iteration of the steering command, and p is a constant.

18. The trajectory control system of claim 17, wherein:

the trajectory control system further includes a perception module configured to identify a target path for the vehicle and a planning module configured to determine a blend path for the vehicle to the target path; and the EPS system is configured to adjust the steering angle of wheels of the vehicle to move the vehicle along the blend path towards the target path.

19. The trajectory control system of claim 18, further comprising a camera generating images in a path of the vehicle.

20. The trajectory control system of claim 19, wherein the perception module performs processing on the images to identify lane lines and identifies the target path for the vehicle in response to the lane lines.

* * * * *